Aug. 6, 1957 E. G. SPACK 2,802,059
TELEPHONE RING-UP CIRCUIT
Filed July 8, 1954
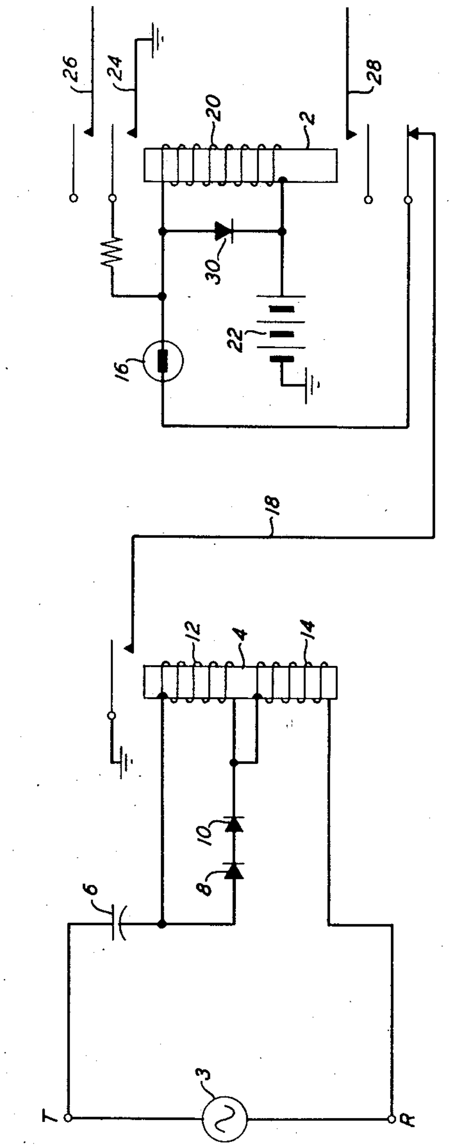
INVENTOR
E. G. SPACK
BY V. P. Priolo
ATTORNEY

United States Patent Office 2,802,059
Patented Aug. 6, 1957

2,802,059

TELEPHONE RING-UP CIRCUIT

Edward G. Spack, Yonkers, N. Y., assignor to Bell Telephone Laboratories, Incorporated, New York, N. Y., a corporation of New York Application July 8, 1954, Serial No. 441,999

3 Claims. (Cl. 179—84)

This invention relates to delayed operation circuits, and more particularly to telephone ring-up circuits.

It is an object of this invention to provide a metallic ring-up circuit which will respond only to regular legitimate ringing currents and not to transient currents produced by dial pulses and disconnects.

The primary function of this ring-up circuit is to start the operation of a device, such as an automatic telephone answering set, by responding to a ringing signal from the central office. A sensitive relay and a series condenser form a high-impedance circuit which is bridged across the line. This relay responds to ringing signals. However, unlike other relay-type ringing circuits, it does not hold operated during the ringing signal. Instead it pulses at the ringing current frequency. If desirable, the relay may be designed in such manner that an audible signal will be produced by the recurrent striking of the relay armature against its core. The repeated closures of the relay contact cause the operation of a second relay through a thermistor time delay circuit. The thermistor circuit delays the operation of the second relay to prolong the audible signal, and it prevents the operation of the second relay on a momentary closure of the contact of the sensitive relay which may occur due to dial make and reverse battery disconnect transients.

The sensitive relay does not respond to dial break transients or other transients of the same polarity by virtue of varistors which shunt a portion of the relay winding. Transients of the opposite polarity (such as dial make and reverse battery disconnect transients) may kick up the sensitive relay momentarily, but the delay action of the thermistor prevents the second relay from operating.

Upon operating, in response to the repeated closures of the sensitive relay contact produced by a legitimate ringing signal, the second relay opens the thermistor circuit to prevent overheating, locks itself up, and starts the operation of the device which may be an automatic telephone answering set.

Bridging of the sensitive relay across the telephone line avoids a ground return and the transmission of noise which may be caused by alternating-current induction.

This and other features of the invention will be more clearly understood from the following detailed description and the accompanying drawing in which The drawing is a circuit schematic of a preferred embodiment of the invention.

Referring now to the drawing, relay 2 is the relay whose operation is to be delayed. Relay 4 is the sensitive relay which responds to the legitimate ringing signal applied to the line terminals T and R. Relay 4, in series with condenser 6, is bridged across the telephone line. When ringing current, preferably 20-cycle ringing current, is applied to the line from a source 3, relay 4 operates.

Relay 4 pulses at a 20 pulse per second rate in response to the ringing signal. Relay 4 does not respond to dial break transients or other transients of the same polarity by virtue of the asymmetrically conductive devices 8 and 10 which shunt the winding 12, and the transformer action of windings 12 and 14. Devices 8 and 10 may be identified as varistors. Relay 4 does not respond to transients having a polarity which causes the devices 8 and 10 to become conductive. When we have such transients, winding 12 is effectively short-circuited and the current induced in winding 12 builds up a flux which cancels the flux produced by the transient current in winding 14. In the same manner relay 4 does not respond to the half wave portion of the ringing signal which causes devices 8 and 10 to become conductive, and thereby provides 20 pulses per second (one pulse for each complete cycle) rather than 40 pulses per second, which would be possible if winding 12 were not shunted by the asymmetrically conductive devices 8 and 10.

To obtain maximum sensitivity relay 4 is limited to a single make contact. The repeated closures of this contact heat up nonlinear resistor 16 by grounding conductor 18 which is connected in series with the resistor 16, winding 20 of relay 2 and battery 22. Resistor 16 has a negative characteristic, that is, its hot resistance is much less than its cold resistance. Resistor 16 may be a thermistor. When the resistance of resistor 16 becomes low enough, relay 2 operates from the ground provided by the contact closure of relay 4. Upon operating, relay 2 opens the resistor circuit to prevent it from overheating, and locks itself up through conductor 24. The work contacts 26 and 28 on relay 2 close the paths to additional relays in the automatic device (telephone answering set) which control the mechanism for starting the operation of said device.

The operate time of relay 2 is a function of the closure time (at a 20 pulse per second rate) of the contact of relay 4. The percentage of closure of relay 4 depends upon the loop conditions as well as its adjustment. The closure may vary from 35 percent make (17.5 milliseconds operated, 32.5 milliseconds released at a 20 pulse per second rate) for a stiff relay in a maximum loop with a 10,000-ohm leak and a minimum ringing voltage, to 65 percent make for a weak relay, zero loop, no leak and maximum ringing voltage. The variation in the operate time of relay 2, as a result of these extremes, is from 100 milliseconds to 800 milliseconds. Therefore, the ring-up circuit will always respond to a one-second ring from the central office.

In the preferred embodiment of the invention, relay 2 has no copper sleeve. However, the flux preserving action of a sleeve is obtained by shunting the relay with the asymmetrically conductive device or varistor 30. This action aids in operating the relay from a pulsing input.

As already noted, while transients which will not cause devices 8 and 10 to become conductive (dial make and reverse battery disconnect transients) may close the contact of relay 4 momentarily, the delay action of nonlinear resistor 16 will prevent the operation of relay 2.

It is to be understood that the above-described arrangements are illustrative of the application of the principles of the invention. Other arrangements may be devised by those skilled in the art without departing from the spirit and scope of the invention.

What is claimed is:

1. A selective signal circuit comprising a first circuit including a first relay, said relay including two serially connected windings, an asymmetrically conductive device connected across one of said windings to render said first relay non-responsive to current flowing through said device, a second circuit including a nonlinear resistor serially connected to the winding of a second relay, said resistor having a negative characteristic, a substantially continuous alternating-current signal, a source of transient signals, said continuous and transient signals being applied across the terminals of said first circuit to pulse said first relay and intermittently establish said second circuit over an operated contact thereof whereby the current drawn through said second circuit heats said resistor, said resistor being heated to the degree required to pass a current of given intensity therethrough and thereby cause said second relay to operate, only when said second circuit is established by said continuous alternating-current signal.

2. A telephone ring-up circuit comprising a telephone line, an alternating-current signal source, a first current path including said telephone line and a first relay bridged thereacross, said relay including two serially connected windings, an asymmetrically conductive device connected across one of said windings, a second current path including a nonlinear resistor serially connected to the winding of a second relay, said nonlinear resistor having a negative characteristic, said second current path being controllable over an operated contact of said first relay, means for applying said alternating-current signal to said telephone line to pulse said first relay and render said second current path effective, whereby the current drawn through said second current path heats said nonlinear resistor to the degree required to pass a current of given intensity therethrough and thereby cause said second relay to operate.

3. A circuit in accordance with claim 2 wherein said second relay, upon operating, opens its own operating circuit through said nonlinear resistor and closes a locking circuit for itself.

References Cited in the file of this patent

UNITED STATES PATENTS

| | | |
|---|---|---|
| 2,290,422 | Fossett | July 21, 1942 |
| 2,304,613 | Vroom | Dec. 8, 1942 |
| 2,482,820 | Wolfson | Sept. 27, 1949 |
| 2,608,608 | Handschin | Aug. 26, 1952 |
| 2,637,416 | Guernsey | May 5, 1953 |

FOREIGN PATENTS

| | | |
|---|---|---|
| 252,220 | Switzerland | Oct. 16, 1948 |